TELEVISION RECEIVER SUPPORT

Filed Nov. 6, 1961 2 Sheets-Sheet 1

John L. Corey,
INVENTOR.
WHANN & McMANIGAL
Attorneys for Applicant
by

Aug. 4, 1964 J. L. COREY 3,143,331

TELEVISION RECEIVER SUPPORT

Filed Nov. 6, 1961 2 Sheets-Sheet 2

John L. Corey,
INVENTOR.

WHANN & McMANIGAL
Attorneys for Applicant by [signature]

3,143,331
Patented Aug. 4, 1964

3,143,331

TELEVISION RECEIVER SUPPORT

John L. Corey, 1134 N. Edgemont, Los Angeles 29, Calif.

Filed Nov. 6, 1961, Ser. No. 150,366
4 Claims. (Cl. 248—356)

This invention relates generally to supports for television receivers and particularly relates to a stanchion adapted to support a television receiver.

Various stands and tables have been devised for supporting television receivers of the portable type. Such portable television receivers include the table models which may be supported on a table, as well as receivers which can be carried by a handle. Most of these television receiver supporting stands or tables permit viewing of the set from a sitting position. However, it is frequently desirable to view a television receiver, for example, from the bed of a bedroom or hospital. To this end, the television receiver should be supported at a greater height than is normally the case. The conventional stand for a television receiver is not well adapted to view the receiver from a bed because in that case the receiver ought to be supported at a considerable height above the floor. If the stand should be made higher it may easily tilt and is awkward to move. Furthermore, since hospital beds may have different heights from the floor, it would be desirable if the height of the television receiver could be readily adjusted. Furthermore, particularly in hospital rooms, there is often not enough space available to support an elaborate stand or table for a television set which has means for adjusting the height of the set.

It is accordingly an object of the present invention to provide a support for a television receiver which has means to adjust the height of the receiver to permit viewing the receiver from a bed.

It is another object of the invention to provide a support for a television receiver which will permit to rotate the receiver through an angle of 360 degrees so that the receiver can be viewed from any position in the room.

A further object of the invention is to provide a television receiver support which takes up little space, which is inexpensive to manufacture, and which is suitable for use in a bedroom, hospital, or the like.

In accordance with the present invention, a support for a television receiver comprises a stanchion having means at the top and bottom of the stanchion to secure it between the floor and ceiling of a room. This stanchion has an offset portion intermediate its ends and the offset of the stanchion is such that the center of gravity of the television receiver supported by the stanchion does not create a lateral moment on the stanchion tending to tilt the stanchion. A supporting member or framework is adapted to support the television receiver and has means for securing it to the offset portion of the stanchion at a fixed or adjustable height with respect to the floor of the room. Preferably means are associated with the top and bottom portions of the stanchion to permit rotation of the stanchion through an angle of 360 degrees. In this manner it is possible to view the television receiver from any position in the room.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2, 3, 4, 5:
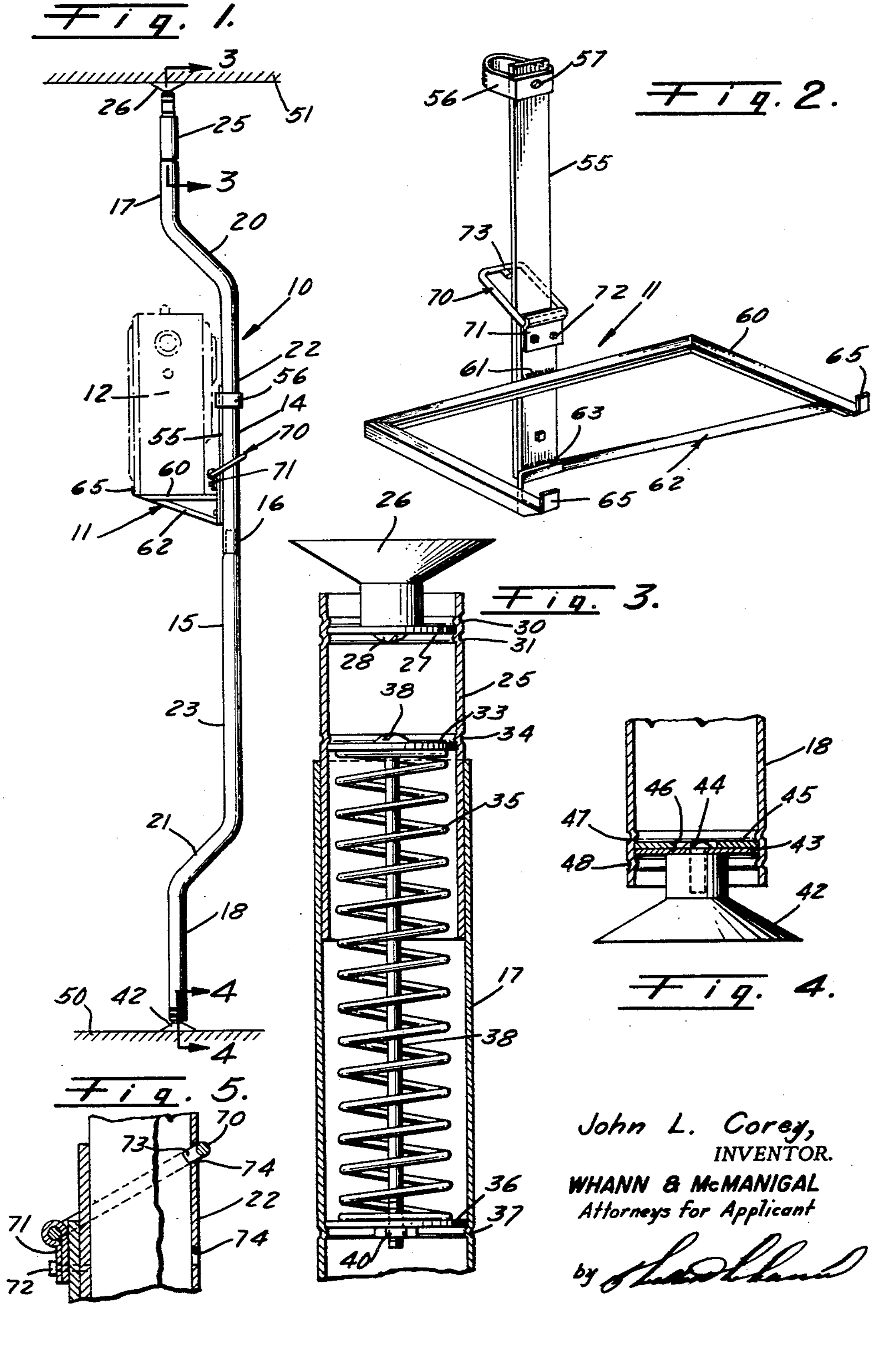
FIG. 1 is a side elevational view of a stanchion and supporting framework for a television receiver in accordance with the present invention and showing a table model receiver supported thereby.
FIG. 2 is a view in perspective of the adjustable framework for supporting the television receiver.
FIG. 3 is an elevational view on enlarged scale, partly in section, take on line 3—3 of FIG. 1 and illustrating the upper swivel support of the stanchion and means for extending and retracting the height of the stanchion.
FIG. 4 is an elevational view on enlarged scale, partly in section, taken on line 4—4 of FIG. 1 and illustrating the lower swivel support of the stanchion.
FIG. 5 is an elevational view, partly in section, illustrating a buckle for adjustably securing the television receiver supporting framework to the stanchion.

Referring now to the drawings and particularly to FIGS. 1 to 5, there is illustrated a support for a television receiver embodying the present invention. The support includes a stanchion, generally indicated at 10, and a framework 11 for supporting a table model television receiver 12. The stanchion 10 preferably consists of a hollow metallic tube and may be made of two sections, indicated at 14 and 15, having a press fit shown at 16. The stanchion 10 has an upper straight portion 17 and a lower straight portion 18. An intermediate portion 20 is joined to the portion 17 and forms an angle of about 45 degrees therewith. The portion 20 extends into a straight portion 22 which again forms an angle of 45 degrees with the intermediate portion 20. Accordingly, it will be seen that the stanchion portion 22 is offset with respect to the upper end portion 17. Similarly, the lower part of the stanchion 10 includes a straight portion 23 forming a 45° angle with an intermediate portion 21. The intermediate portion 21 forms a 45° angle with the straight end portion 18.

Accordingly, it would be evident that the two straight stanchion portions 22 and 23 are offset with respect to the end portions 17 and 18 of the stanchion. The purpose of this offset will be explained hereinafter.

As illustrated particularly in FIG. 3 to which reference is now made, a hollow tube 25 has a sliding fit with and is inserted into the upper portion 17 of the stanchion. A suction pad 26 is rigidly secured to the tube 25. To this end there is provided a washer 27 which is secured by a screw 28 extending into the cylindrical portion of the suction pad 26. The washer 27 is secured to the tube 25 by two annular indentations 30 and 31 between which the washer 27 is firmly held. Accordingly, the suction pad 26 is rigidly connected to tube 25.

Another washer 33 is disposed in the tube 25 and is prevented from upward movement within the tube by another annular indentation 34 on the tube 25 spaced from indentation 30. This washer 33 serves as a bearing for a helical spring 35. The other bearing for the helical spring 35 is provided by another washer 36 disposed in the upper stanchion portion 17. The washer 36 is held against downward movement in the stanchion portion 17 by an annular indentation 37 in the stanchion portion 17. The helical spring 35 urges washers 33 and 36 away from each other. Preferably, a bolt 38 extends through the washer 33 and through a suitable aperture 40 in the lower washer 36. The purpose of this bolt is to prevent the spring 35 from jumping out of the tube 25 when the parts are disassembled.

It will now be evident that the arrangement illustrated in FIG. 3 permits rotation of the stanchion portion 17 with respect to the tube 25. This is so because the tube 25 has a sliding fit in stanchion portion 17 and the helical spring 35 is adapted to rotate with respect to both washers 33 and 36.

The lower portion 18 of the stanchion 10 has a swivel connection with a suction pad 42. To this end there is provided a first washer 43 which is secured to the cylindrical portion of the suction pad 42 by a screw indicated at 44. A second washer 45 is disposed above the first washer 43 and permits rotation of one washer with respect to the other. The washer 45 is provided with a central aperture 46 through which the head of screw 44 extends. The upper washer 45 bears against an annular indentation 47 in the tube 16. A lower annular indentation 48 in the tube 18 retains the two washers 43 and 45 in the tube 18.

When the stanchion 10 is in place between the floor 50 and the ceiling 51 of the room, the two suction pads 26 and 42 will retain or secure the stanchion between the floor and ceiling of the room. The intermediate offset portions 22 and 23 of the stanchion can now be rotated with respect to the end portions 17 and 18. As explained hereinbefore, rotation of the end portion 17 is effected because the stanchion portion 17 will rotate about the tube 25 and the coil spring 35 will slidingly rotate with respect to its washers 33 and 36. On the other hand, the suction pad 42 which is fixed to the floor 50 of the room still permits rotation of the lower stanchion portion 18. In this case, the washer 45 is permitted to slidingly rotate with respect to the washer 43 which is fixed to the stationary suction pad 42. Hence, a swivel motion is made possible between the fixed suction pad 42 and the stanchion 10.

Compression or expansion of the helical spring 35 and a corresponding trombone-like sliding movement of tubes 17 and 25 away or into each other permits adjustment of the height of the stanchion 10 to differences in height of the room.

The framework 11 which supports the television receiver 12 is illustrated particularly in FIG. 2 to which reference is now made. The framework 11 includes a vertical bar 55 which is adapted to bear against the intermediate stanchion portion 22. Attached to the upper end of the bar 55 is a loop-shaped retaining member 56 which may be secured to the bar, for example, by a screw 57. The loop-shaped retainer 56 slides along the stanchion and retains the framework 11.

Rigidly affixed to the bar 55 there is a horizontal support 60 which may consists of a channel member of generally L-shape. The horizontal support 60 may, for example, be welded to the bar 55, as indicated at 61. A generally U-shaped reinforcing strap 62 has its middle portion 63 welded or otherwise secured to the lower portion of the bar 55. As shown in FIGS. 1 and 2, the reinforcing strap 62 extends upwardly at an angle and is secured to the downwardly extending ridge of the horizontal support 60. The outer or end portions of the support 60 are upwardly bent, as shown at 65, to retain the television receiver 12.

Supported above the horizontal support 60 is a buckle, generally indicated at 70. A bent over sheet 71 forming a bearing for the buckle may be attached to the bar 55 by screws, as shown at 72. The loop-shaped buckle is provided with a retaining pin 73 which cooperates with suitable spaced-apart apertures 74 which may be provided in the offset portions 22 and 23 of the stanchion, as illustrated particularly in FIG. 5. Thus, the framework 11 may have its height adjusted by moving the buckle into one of the several apertures 74 provided in the stanchion. The uppermost one of the apertures 74 should be spaced sufficiently from bent portion 20 so that the receiver 12 does not come too close to the stanchion portion 20.

It will now be apparent that the helical spring 35 provides for an adjustment of the total height of the stanchion 10 to take up variations in the effective height between the floor and the ceiling of the room. If the room should be larger or smaller, the spring 35 will expand or contract to accommodate the stanchion to relatively small variations in the height of the room. The stanchion may be easily removed by pushing the tube 25 into the stanchion portion 17 until the stanchion can be tilted and the tube 25 removed from the upper stanchion portion 17.

It will also be obvious that the washer 27 is first inserted into the tube 25 after it has been attached to the suction pad 26. Thereafter, the washer 27 is fixed in position by providing the annular indentations 30 and 31. Similarly, the washers 43 and 45 are first inserted into the stanchion portion 18 and thereafter the annular indentations 47 and 48 are provided which will prevent the washers from being removed. However, the washers 33 and 36 may be inserted respectively into the tube 25 and the stanchion portion 17 after the indentations 34 and 37 have been formed.

From the above description it will be apparent that the stanchion 10 may be rotated about its fixed supports provided by the suction pads 26 and 42 so that the television receiver 12 may be viewed from any position in the room in which the support is installed. Furthermore, the height of the supporting frame 11 may be adjusted with respect to the floor by means of the buckle 70 and the cooperating apertures 74 on the stanchion.

Figures 6, 7, 8, 9, 10:
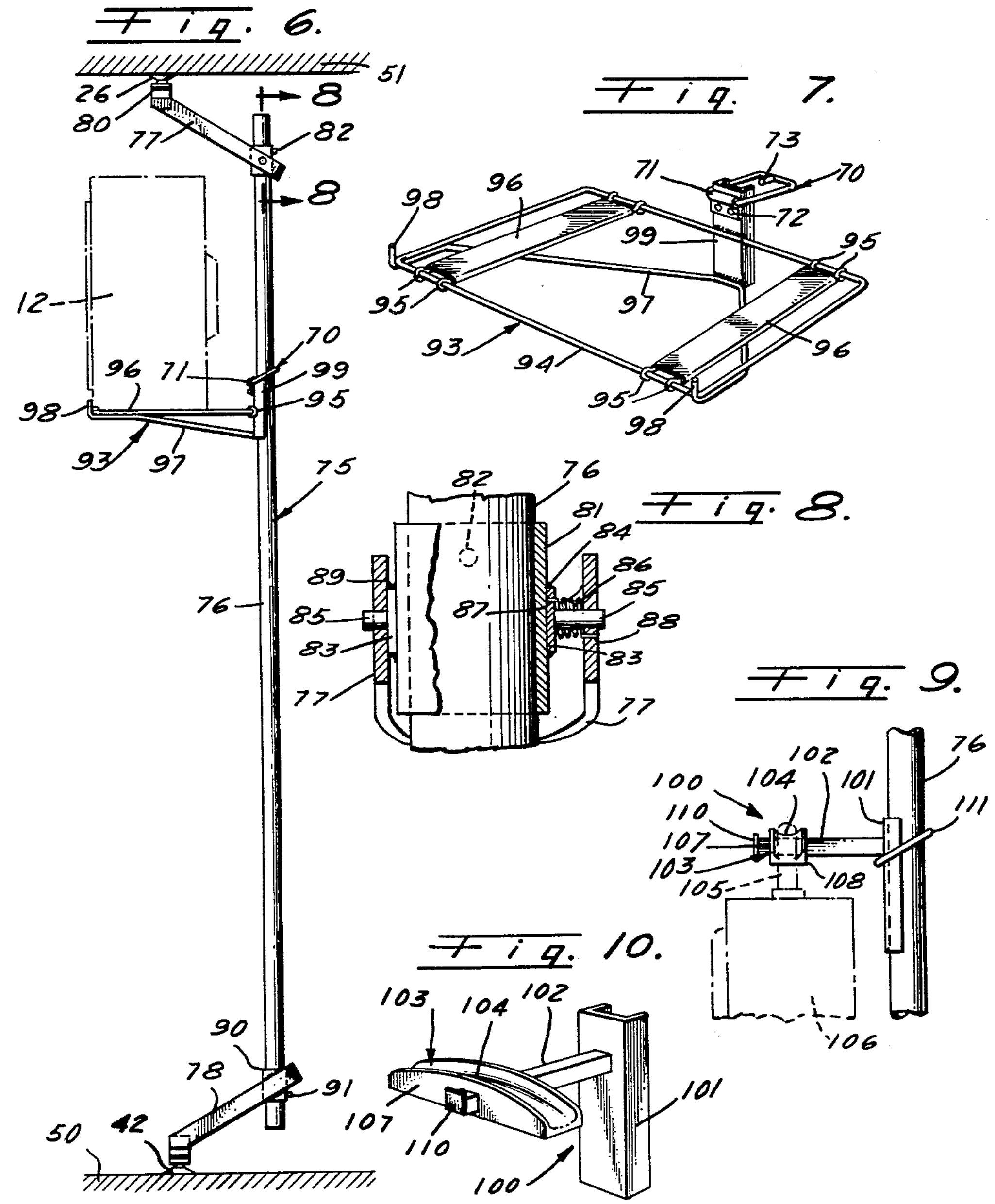
FIG. 6 is a side elevational view of a modified stanchion and supporting framework for a television receiver embodying the present invention and showing a table model receiver supported thereby.
FIG. 7 is a view in perspective of the adjustable framework of FIG. 6.
FIG. 8 is an elevational view on enlarged scale, partly in section, taken on line 8—8 of FIG. 6 and illustrating the upper swivel support of the stanchion.
FIG. 9 is a side elevational, broken-away view of another embodiment of a receiver supporting frame for supporting a set provided with a handle.
FIG. 10 is a view in perspective of the receiver supporting frame of FIG. 9.

A modification of the stanchion and frame in accordance with the present invention is illustrated in FIGS. 6–8 to which reference is now made. The stanchion, generally indicated at 75, may consist of a straight hollow tube 76 which may be made in one piece or in two portions having a press fit as illustrated in connection with FIG. 1. A top portion 77 and a bottom portion 78 extend each at an angle with respect to the straight tube 76. Thus, the stanchion 75 again has an intermediate offset portion 76 forming an angle of, say, about 45 degrees with its end portions 77 and 78. The end portion 77 may conssit of a flat strip having a generally U-shape and secured at its outer end to a tube or other suitable member 80 to which is fixedly secured a suction cup 26. The suction cup 26 may be secured to the supporting member 80 in the manner illustrated, for example, in FIG. 4 to permit rotation of the angular end portion 77 of the stanchion with respect to the suction cup 26.

As illustrated particularly in FIG. 8, a tubular member 81 has a sliding fit over the stanchion portion 76 and may be secured thereto by a set screw 82. The slidable tube 81 is provided on opposite sides with suitable washers 83 which may be welded or otherwise secured to the tube 81 as by welds 84. A pin 85 is fixedly secured to each of the washers 84 and projects therefrom to form a bearing support for the end portion 77. A coil spring 86 has one end secured through an opening or aperture 87 and a washer 84 while its other end extends through an opening 88 in the end portion 77. The coil spring 86 is so arranged that it urges the end portion 77 upwards, as viewed in FIG. 6. This construction provides for an adjustment of the total height of the stanchion 76 in the manner to be more fully explained hereinafter.

The lower end portion 78 of the stanchion 75 is welded or otherwise fixedly secured to a tube 90 which is adapted to slide over the stanchion 76. The tube 90 may be locked by a set screw 91 in any suitable position. A suction cup 42 is again secured to the end portion 78 and may have the construction illustrated, for example, in FIG. 4 to permit rotation of the stanchion 75 through an angle of 360 degrees about the fixed suction cups 26 and 42.

It will thus be apparent that the height of the stanchion between the two suction cups 26 and 42 is adjustable by means of the set screws 82 and 91. Furthermore, the coil spring 86 urges the end portion 77 upwards and into engagement with the ceiling 51.

A frame 93 for supporting the television receiver 12, which may be of the table model type, is illustrated particularly in FIG. 7 to which reference is now made. The frame 93 consists of a rectangular-shaped wire 94 by means of which the television receiver may be supported. The frame 93 has an adjustable support which includes two pairs of wires 95, each of the wires having a closed loop or ear at both of its ends which are slidingly engaged by the wire frame 94. A suitable metal sheet 96 extends over each pair of wires 95 and may be rolled about each of the wires and spot welded thereto. Thus, it will be seen that each of the pairs of wires 95 is slidable along the wire frame 94 to accommodate television receivers of variable length.

The rear portion of the wire frame 94 is secured, such as by welding, to a U-shaped channel member 96 which embraces the stanchion 76. By virtue of the U-shape of channel member 99, a more intimate contact is provided with the circular stanchion 75. A reinforcing wire 97 may have its rear portion welded or otherwise secured to the U-shaped channel 96 and extends upwardly to contact the rectangular wire frame 94 to which it is secured, for example, by welding. The reinforcing wire 97 has its end portions bent upwardly, as shown at 98, to retain the television receiver 12.

The buckle 70 may again be secured to the U-shaped channel member 99 in the manner previously described particularly in connection with FIGS. 2 and 5. The retaining pin 73 of the buckle 70 engages one of a plurality of apertures provided in the stanchion portion 76 and thus permits adjustment of the height of the television receiver.

It will thus be seen that the embodiment of the invention of FIGS. 6–8 again permits rotation of the television receiver through an angle of 360 degrees. This is effected by virtue of the swivel connection of the suction cups 26 and 42 with their respective end portions 77 and 78. Furthermore, the height of the stanchion can be adjusted by sliding the respective tubes 81 or 90 with respect to the stanchion porton 76 and locking them with their locking screws 82 and 91 in the desired position. Furthermore, small variations of height of the ceiling 51 with respect to the floor 50 of the room may be accommodated by the coil spring 86 which urges the end portion 77 upwards in interengagement with the ceiling 51. The two pairs of wires 95 permit movement of the two supporting members toward each other or away from each other to accommodate television receivers of various lengths.

Figure 11:
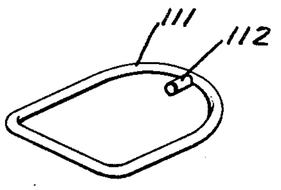
FIG. 11 is a view in perspective of a buckle for adjustably securing the supporting frame of FIG. 10 to the stanchion.

A further embodiment of the present invention is illustrated in FIGS. 9–11 to which reference is now made. This embodiment of the invention will accommodate television receivers of the type having a carrying handle or strap at the top thereof. The embodiment of FIGS. 9–11 includes a a supporting framework, generally indicated at 100, which may be utilized in connection with the stanchion 10 of FIG. 1 or the stanchion 75 of FIG. 6. The framework 100 includes a U-shaped channel 101 which is adapted to slide along, for example, the stanchion 76 of FIG. 6. Extending from the U-shaped channel member 101 is a square tube 102 which is suitably secured to the channel 101, for example, by welding. A saddle-shaped supporting member 103 has a square aperture and is slidably received by the square tube 102. The saddle member 103 has a saddle surface 104 with raised front and rear portions to accommodate the carrying strap, illustrated at 105, of a portable television receiver 106. The saddle member 103 has a front portion 107 and a rear portion 108 provided with square apertures to receive the square tube 102. The free end of the square tube 102 may be provided with a stop plate 110 to prevent the saddle member 103 from sliding through the square tube 102. A loop-shaped buckle 111 having a retaining pin 112, as illustrated in FIG. 11, serves the purpose to secure the framework 100 to the stanchion 76 at an adjustable height in the manner previously explained.

Since the television receiver 106 can be readily supported by its carrying handle 105, it is not necessary to provide a horizontal framework, such as illustrated in FIGS. 2 or 7. In other words, the television receiver is solely supported by its carrying handle 105 which slips over the saddle surface 104 and is securely retained thereby.

The construction of FIGS. 9–11 thus is much simplified over the ones illustrated in the previous figures. However, it will be understood that this type support will only accommodate a television receiver having a carrying handle.

There has thus been disclosed a support for a television receiver which affords rotation of the television receiver through an angle of 360 degrees. Furthermore, the construction is such that the height of the television receiver may be adjusted to one of several predetermined positions. The support of the present invention takes up very little space and is relatively cheap in manufacture. It will be noted from an inspection of FIGS. 1 or 6 that the center of gravity of the television receiver 12 extends substantially through the straight upper and lower portions 17 and 18 of the stanchion. Thus, the television set is securely held and is supported through an axis which extends through the two suction pads of the support. In other words, the center of gravity of the television receiver does not create a lateral moment on the stanchion tending to tilt the stanchion.

I claim:

1. A support for a television receiver comprising a stanchion having an upper and lower end portion and an intermediate portion offset with respect to said end portions, a first suction pad means providing a swivel connection between one end portion of said stanchion and said first suction pad, a second suction pad, a hollow tube, said second suction pad being secured to one end of said hollow tube, the other end of said hollow tube having a sliding fit with the other end portion of said stanchion, said other end portion of said stanchion being hollow, means in said hollow tube and in said other end portion of said stanchion for rotatably and slidably supporting said hollow tube with respect to said other end portion, a framework for supporting a television receiver, a buckle having a pin thereon and disposed on said framework, and spaced apart apertures in said offset stanchion portion adapted for engagement with the pin of said buckle to support said framework on said stanchion in a selected position, the offset of said intermediate stanchion portion being such that the center of gravity of the television receiver extends substantially through said upper and lower end portions of said stanchion.

2. A support for a television receiver comprising a stanchion having an upper and lower end portion and an intermediate portion offset with respect to said end portions, a first suction pad, means providing a swivel connection between the lower end portion of said stanchion and said first suction pad, a second suction pad, a hollow tube, said second suction pad being secured to one end of said hollow tube, the other end of said hollow tube having a sliding fit with the upper end portion of said stanchion, said upper end portion of said stanchion being hollow, bearing means in said hollow tube and in said upper end portion of said stanchion spaced from each other, a spring disposed between said bearing means and urging said hollow tube away from said upper end portion and permitting rotation of said offset stanchion portion with respect to said suction pads, a framework for supporting a television receiver, means carried by said framework for securing said framework to said offset stanchion portion in a selected position, the offset of said intermediate stanchion portion being such that the center of gravity of the television receiver extends substantially through said upper and lower end portions of said stanchion.

3. A support for a television receiver comprising a stanchion having a straight upper and lower end portion and an intermediate portion offset with respect to said end portions, a first suction pad, means providing a swivel connection between the lower end portion of said stanchion and said first suction pad, a second suction pad, a hollow tube, said second suction pad being secured to one end of said hollow tube, the other end of said hollow tube having a sliding fit with the upper end portion of said stanchion, said upper end portion of said stanchion being hollow, bearing means in said hollow tube and in said upper end portion of said stanchion spaced from each other, a spring disposed between said bearing means and urging said hollow tube away from said upper end portion and permitting rotation of said offset stanchion portion with respect to said suction pads, a framework for supporting a television receiver, a buckle having a pin thereon and secured to said framework, and spaced apart apertures in said offset stanchion portion adapted for engagement with the pin of said buckle to support said framework on said stanchion in a selected position, the offset of said intermedate stanchion portion being such that the center of gravity of the television receiver extends substantially through said upper and lower end portions of said stanchion.

4. A support for a television receiver comprising a stanchion having a straight upper and lower end portion and an intermediate portion offset with respect to said end portions, a first suction pad, means providing a swivel connection between the lower end portion of said stanchion and said first suction pad, a second suction pad, a hollow tube, said second suction pad being secured to one end of said hollow tube, the other end of said hollow tube having a sliding fit with the upper end portion of said stanchion, said upper end portion of said stanchion being hollow, bearing means including a first washer secured to said hollow tube and a second washer secured to said upper end portion of said stanchion, said washers being spaced from each other, a spring disposed between said washers and urging said hollow tube away from said upper end portion and permitting rotation of said offset stanchion portion with respect to said suction pads, the offset of said intermediate stanchion portion being such that the center of gravity of the television receiver extends substantially through said upper and lower end portions of said stanchion, a framework having a horizontal portion for supporting a television receiver, a buckle having a pin thereon and disposed on said framework, and spaced apart apertures in said offset stanchion portion adapted for engagement with the pin of said buckle to support said framework on said stanchion in a selected position.

References Cited in the file of this patent

UNITED STATES PATENTS

| | | |
|---|---|---|
| 875,970 | Watt | Jan. 7, 1908 |
| 1,373,781 | Wagner | Apr. 5, 1921 |
| 1,833,834 | Hardsocg | Nov. 24, 1931 |
| 1,904,656 | Fellay | Apr. 18, 1933 |
| 2,057,832 | Jeffrey | Oct. 20, 1936 |
| 2,854,293 | Riblet | Sept. 30, 1958 |
| 2,903,227 | Key | Sept. 8, 1959 |
| 2,941,669 | Palay et al. | June 21, 1960 |